(12) United States Patent
Chiu et al.

(10) Patent No.: US 7,400,900 B2
(45) Date of Patent: Jul. 15, 2008

(54) MOBILE TERMINAL

(75) Inventors: Li-Chi Chiu, Yuan-Lin Chen (TW);
Chien-Hua Huang, Shan-Hua Chen (TW); Shou-Tsai Chen, Yuan-Chang Hsiang (TW)

(73) Assignee: Universal Scientific Industrial Co., Ltd. (TW)

( * ) Notice: Subject to any disclaimer, the term of this patent is extended or adjusted under 35 U.S.C. 154(b) by 425 days.

(21) Appl. No.: 11/014,278

(22) Filed: Dec. 16, 2004

(65) Prior Publication Data

US 2006/0045044 A1    Mar. 2, 2006

(30) Foreign Application Priority Data

Aug. 27, 2004   (TW)  .............................. 93213626 U

(51) Int. Cl.
*H04B 1/04* (2006.01)
*H04B 1/38* (2006.01)

(52) U.S. Cl. ..................... 455/522; 455/127.1; 455/572

(58) Field of Classification Search ...................... None
See application file for complete search history.

(56) References Cited

U.S. PATENT DOCUMENTS

| 4,933,963 | A  | * | 6/1990 | Sato et al. | ................... | 704/224 |
| 2001/0053707 | A1 | * | 12/2001 | Lutnaes | ..................... | 455/566 |
| 2002/0058527 | A1 | * | 5/2002 | Kawasaki et al. | ........... | 455/550 |
| 2004/0055011 | A1 | * | 3/2004 | Bae et al. | ...................... | 725/62 |

* cited by examiner

*Primary Examiner*—Lester Kincaid
*Assistant Examiner*—Joel Ajayi
(74) *Attorney, Agent, or Firm*—Ostrolenk, Faber, Gerb & Soffen, LLP

(57) ABSTRACT

A mobile terminal includes a power managing unit coupled to a control unit, and a switch unit coupled to the control unit and the power managing unit. The switch unit is operable so as to enable the power managing unit to supply electric power to the control unit. The switch unit is further operable so as to enable the control unit to perform one of controlling the power managing unit to stop supply of electric power thereto and a predetermined operation in response to duration of user actuation of the switch unit.

5 Claims, 2 Drawing Sheets

MOBILE TERMINAL

CROSS-REFERENCE TO RELATED APPLICATION

This application claims priority of Taiwanese Application No. 093213626, filed on Aug. 27, 2004.

BACKGROUND OF THE INVENTION

1. Field of the Invention

The invention relates to a mobile terminal, more particularly to a mobile terminal that has a multi-function switch unit provided with a single button switch.

2. Description of the Related Art

Generally, a conventional mobile terminal is provided with an ON/OFF key for controlling the conventional mobile to turn on and shut down, and an on/off-hook key for controlling on-hook and off-hook operations. If the above operations associated with the ON/OFF key and the on/off-hook key can be integrated using a single control key, costs for the mobile terminal can be reduced.

SUMMARY OF THE INVENTION

Therefore, the object of the present invention is to provide a mobile terminal that has a multi-function switch unit including a single push button switch.

According to the present invention, a mobile terminal comprises:

a control unit;

a power managing unit coupled to the control unit; and a switch unit coupled to the control unit and the power managing unit, the switch unit being operable so as to enable the power managing unit to supply electric power to the control unit, the switch unit being further operable so as to enable the control unit to perform one of controlling the power managing unit to stop supply of electric power thereto and a predetermined operation in response to a duration of user actuation of the switch unit.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
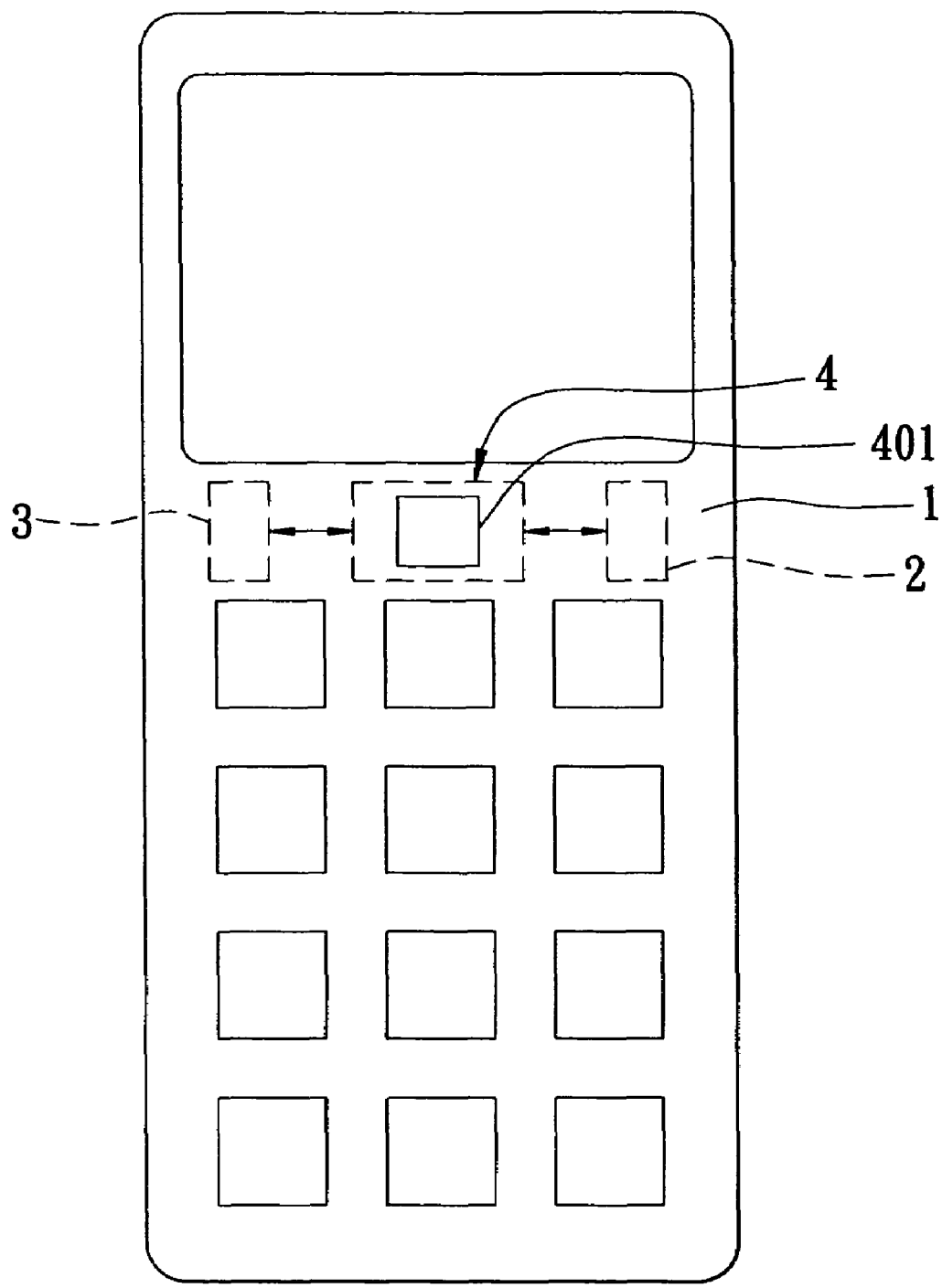
FIG. 1 is a schematic view showing the preferred embodiment of a mobile terminal according to this invention.
Figure 2:
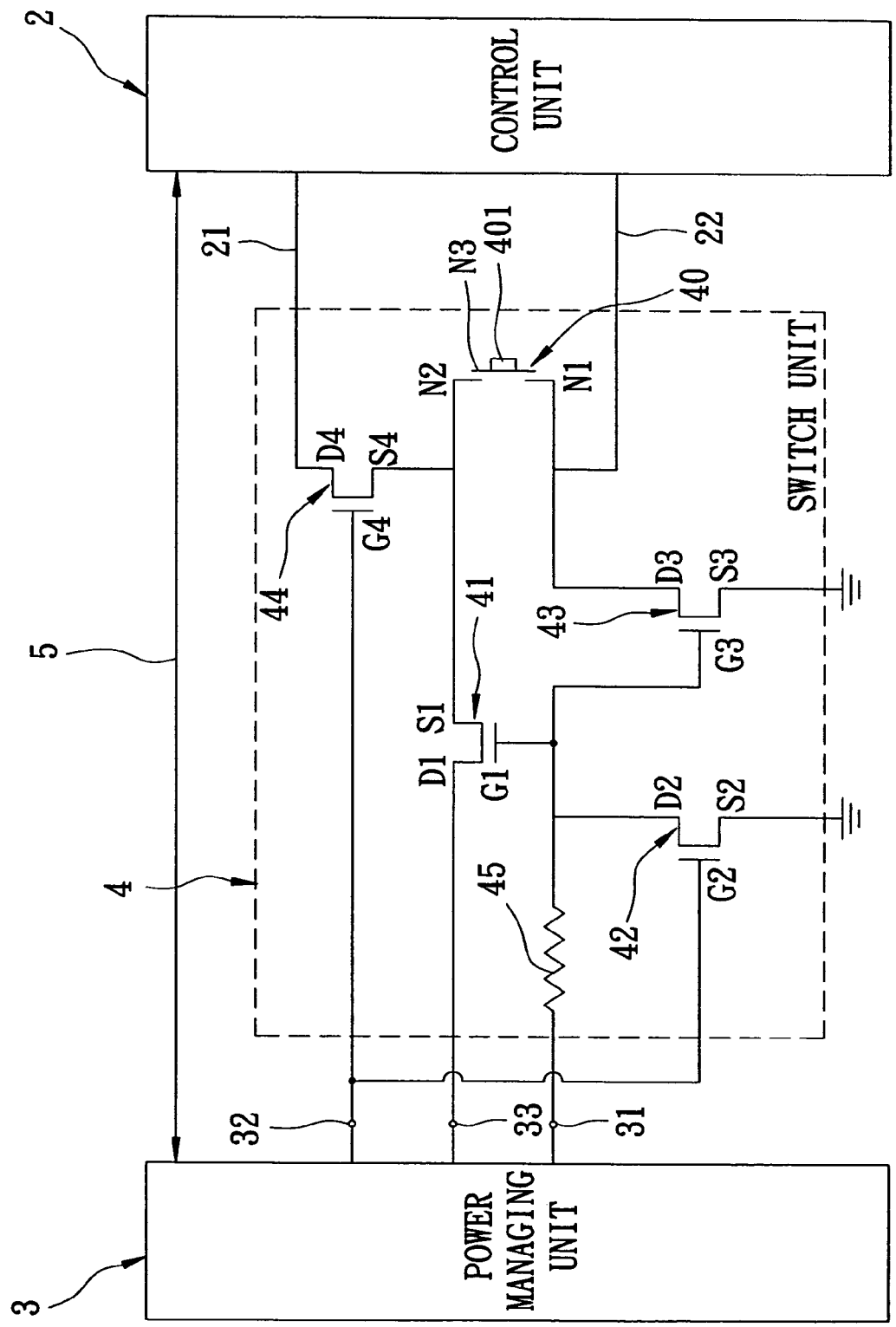
FIG. 2 is a schematic circuit block diagram illustrating the preferred embodiment.

Referring to FIGS. 1 and 2, the preferred embodiment of a mobile terminal according to the present invention is shown to include a housing 1, a control unit 2, a power managing unit 3, and a switch unit 4.

The control unit 2 is mounted in the housing 1, and includes first and second terminals 22, 21. In this embodiment, the control unit 2 is configured to perform a predetermined operation when the first and second terminals 22, 21 are interconnected. In this embodiment, the control unit 2 can be a BCM1160 IC available from BROADCOM Corporation or a PCF5213 IC available from Philips Semiconductors Corporation. For example, if the control unit 2 is a BCM1160 IC, the first and second terminals 22, 21 are GPIO_3 and GPIO_10 pins, respectively.

The power managing unit 3 is mounted in the housing 1, and is coupled to the control unit 2 via an I2C interface 5. In this embodiment, the power managing unit 3 includes first, second and third nodes 31, 32, 33, and is operable in one of a non-power supplying mode, where the power managing unit 3 provides a logic-high voltage signal at the first node 31, and a logic-low voltage signal at the second node 32, and a power supplying mode, where the power managing unit 3 provides a logic-high voltage signal at each of the first and second nodes 31, 32 and where the power managing unit 3 supplies electric power to the control unit 2. The third node 33 is the falling-edge triggered used to switch from the non-power supplying mode to the power supplying mode. It means, when the mobile terminal is off, the power managing unit 3 provides a logic-high voltage signal at the third node 33, but if the logic-low voltage is provided at the third node 33, the mobile terminal is triggered on. Following the mobile terminal is on, the third node 33 is returned to the logic-high voltage. In this embodiment, the power managing unit 3 can be a PCF50603 IC available from Philips Semiconductors Corporation or a TPS65012 IC available from TEXAS INSTRUMENTS Corporation. For example, if the power managing unit 3 is a PCF50603 IC, the first and second nodes 31, 32 are VINT and IOVDD pins, respectively.

The switch unit 4 is coupled to the control unit 2 and the power managing unit 3. The switch unit 4 is operable so as to enable the power managing unit 3 to supply electric power to the control unit 2. The switch unit 4 is further operable so as to enable the control unit 2 to perform one of controlling the power managing unit 3 to stop supply of electric power thereto and a predetermined operation in response to duration of user actuation of the switch unit 4. In this embodiment, the switch unit 4 includes a resistor 45, first to fourth voltage-controlled switches 41-44, each of which is an NMOS transistor in this embodiment, and a manually-operable switch 40, which is a push button switch in this embodiment. The first voltage-controlled switch 41 has a first end (D1) coupled to the third node 33 of the power managing unit 3, a second end (S1), and a first control end (G1) coupled to the first node 31 of the power managing unit 3 via the resistor 45. The second voltage-controlled switch 42 has a third end (D2) coupled to the first node 31 of the power managing unit 3 via the resistor 45, a grounded fourth end (S2), and a second control end (G2) coupled to the second node 32 of the power managing unit 3. The third voltage-controlled switch 43 has a fifth end (D3) coupled to the first terminal 22 of the control unit 2, a grounded sixth end (S3), and a third control end (G3) coupled to the first node 31 of the power managing unit 3 via the resistor 45. The fourth voltage-controlled switch 44 has a seventh end (D4) coupled to the second terminal 21 of the control unit 2, an eighth end (S4) coupled to the second end (S1) of the first voltage-controlled switch 41, and a fourth control end (G4) coupled to the second node 32 of the power managing unit 3. The manually-operable switch 40 has a ninth end (N2) coupled to the second end (S1) of the first voltage-controlled switch 41 and the eighth end (S4) of the fourth voltage-controlled switch 44, a tenth end (N1) coupled to the fifth end (D3) of the third voltage-controlled switch 43 and the first terminal 22 of the control unit 2, and a manually-operable end (N3) mounted with a button 401 that is disposed on the housing 1, as shown in FIG. 1.

In actual use, initially, when the power managing unit 3 is in the non-power supplying mode, i.e., the mobile terminal is off, the switch unit 4 is operable via pressing of the button 401 to turn on the manually-operable switch 40 so that the first and third voltage-controlled switches 41, 43 are turned on and grounded, the second and fourth voltage-controlled switches 42, 44 are turned off, thus providing a logic-low voltage signal to the third node 33 of the power managing unit 3 such that the power managing unit 3 is falling-edge triggered to switch from the non-power supplying mode to the power supplying mode, i.e. the mobile terminal is on. At this time, the power managing unit 3 provides a logic-high voltage signal at the second node 32, so that the second and fourth voltage-controlled switches 42, 44 are turned on, the first and third voltage-controlled switches 41, 43 are turned off, and the power managing unit 3 may provide a logic-high voltage signal at the third node 33. Subsequently, when the switch unit 4 is further operated via pressing of the button 401, the control unit 2 performs the predetermined operation, such as an on-hook or off-hook operation if the duration of actuation of the button 401 of the switch 40 does not exceed a predetermined period, such as 3 seconds, and enables the power managing unit 3 to switch from the power supplying mode to the non-power supplying mode, i.e., the mobile terminal is shut down, if the duration of user actuation of the button 401 of the switch 40 exceeds the predetermined period.

To sum up, by virtue of the switch unit 4, the mobile terminal of this invention is capable of performing multiple functions using a fewer number of keys.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. A mobile terminal comprising:
    a control unit;
    a power managing unit coupled to said control unit; and
    a switch unit coupled to said control unit and said power managing unit, said switch unit comprising a single switch which is operable so as to enable said power managing unit to supply electric power to said control unit, said switch being further operable so as to enable said control unit to perform one of controlling said power managing unit to stop supply of electric power thereto and a predetermined operation in response to a duration of user actuation of said switch;
    wherein said power managing unit includes first, second and third nodes, and is operable in one of:
        a non-power supplying mode, where said power managing unit provides
            a logic-high voltage signal at each of said first and third nodes, and
            a logic-low voltage signal at said second node, and
        a power supplying mode, where said power managing unit provides
            a logic-high voltage signal at each of said first and second nodes
            and where said power managing unit supplies electric power to said control unit;
    said switch unit including:
        a first voltage-controlled switch having
            a first end coupled to said third node of said power managing unit,
            a second end, and a first control end coupled to said first node of said power managing unit,
        a second voltage-controlled switch having
            a third end coupled to said first node of said power managing unit,
            a grounded fourth end, and
            a second control end coupled to said second node of said power managing unit,
        a third voltage-controlled switch having
            a fifth end coupled to a first terminal of said control unit,
            a grounded sixth end, and
            a third control end coupled to said first node of said power managing unit,
        a fourth voltage-controlled switch having
            a seventh end coupled to a second terminal of said control unit,
            an eighth end coupled to said second end of said first voltage-controlled switch, and
            a fourth control end coupled to said second node of said power managing unit, and
        a manually-operable switch having
            a ninth end coupled to said second end of said first voltage-controlled switch and said eighth end of said fourth voltage-controlled switch,
            a tenth end coupled to said fifth end of said third voltage-controlled switch and said first terminal of said control unit, and
            a manually-operable end;
    wherein said power managing unit switches from the non-power supplying mode to the power supplying mode when said switch unit is operated, so as to provide a logic-low voltage signal to said third node of said power managing unit.

2. The mobile terminal as claimed in claim 1, wherein said control unit enables said power managing unit to switch from the power supplying mode to the non-power supplying mode when the duration of user actuation of said switch exceeds a predetermined period.

3. The mobile terminal as claimed in claim 2, wherein the predetermined operation is one of on-hook and off-hook operations.

4. The mobile terminal as claimed in claim 2, wherein each of said first, second, third and fourth voltage-controlled switches is an NMOS transistor, and said manually-operable switch is a push button switch.

5. The mobile terminal as claimed in claim 1, further comprising an I2C interface interconnecting said power managing unit and said control unit.

* * * * *